J. B. BENTON, J. F. BEHN & G. BASTIAN.
MACHINE FOR RAKING AND LOADING HAY.
No. 20,772. Patented July 6, 1858.
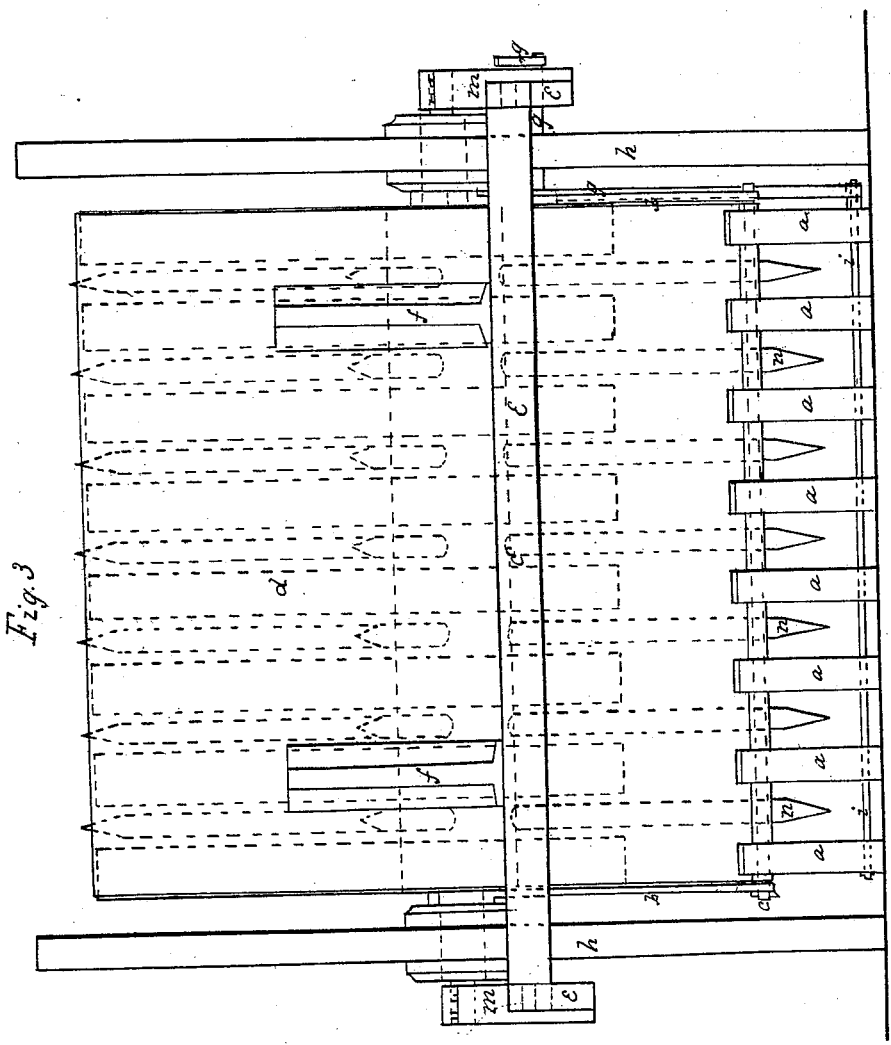

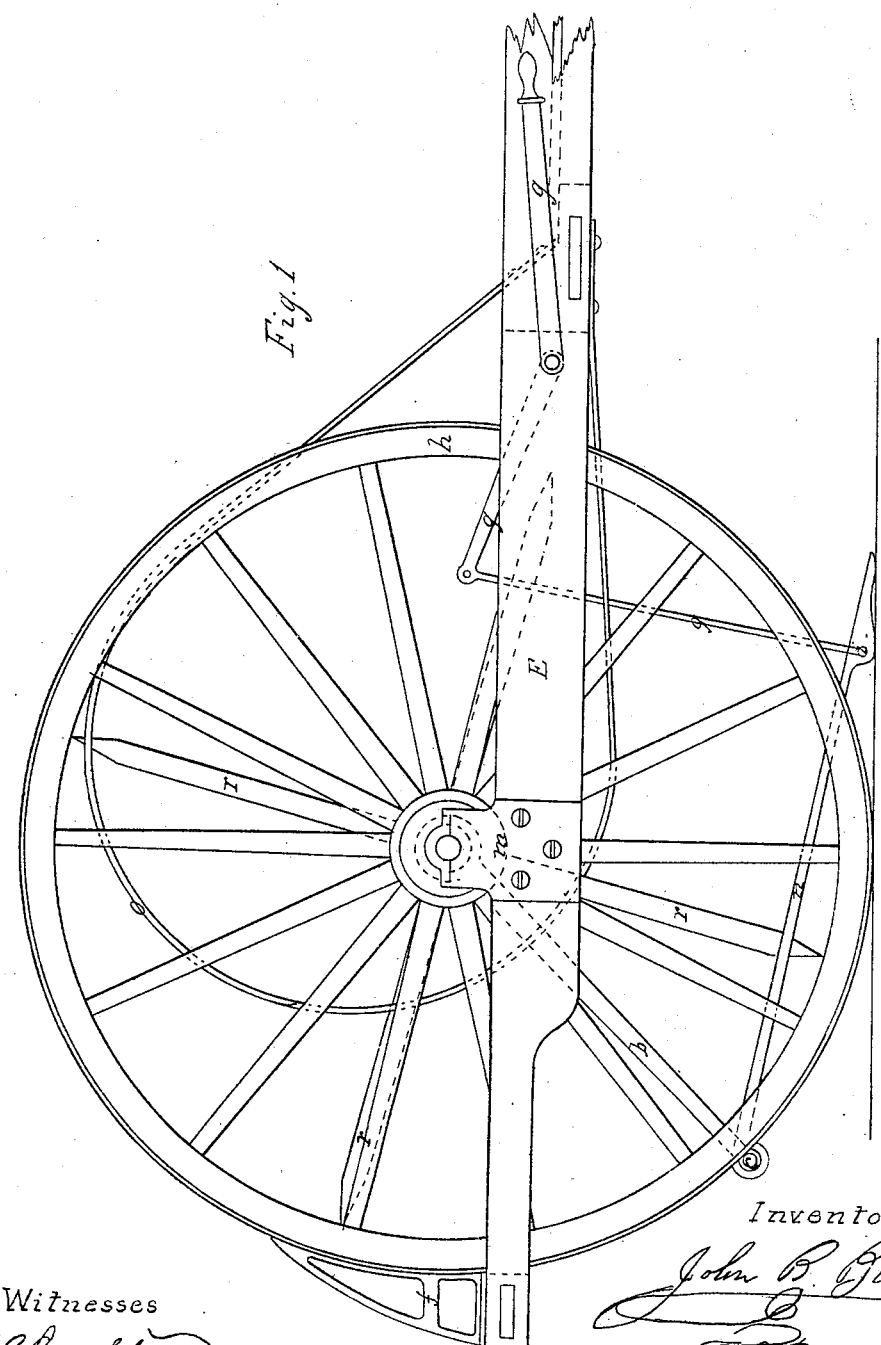

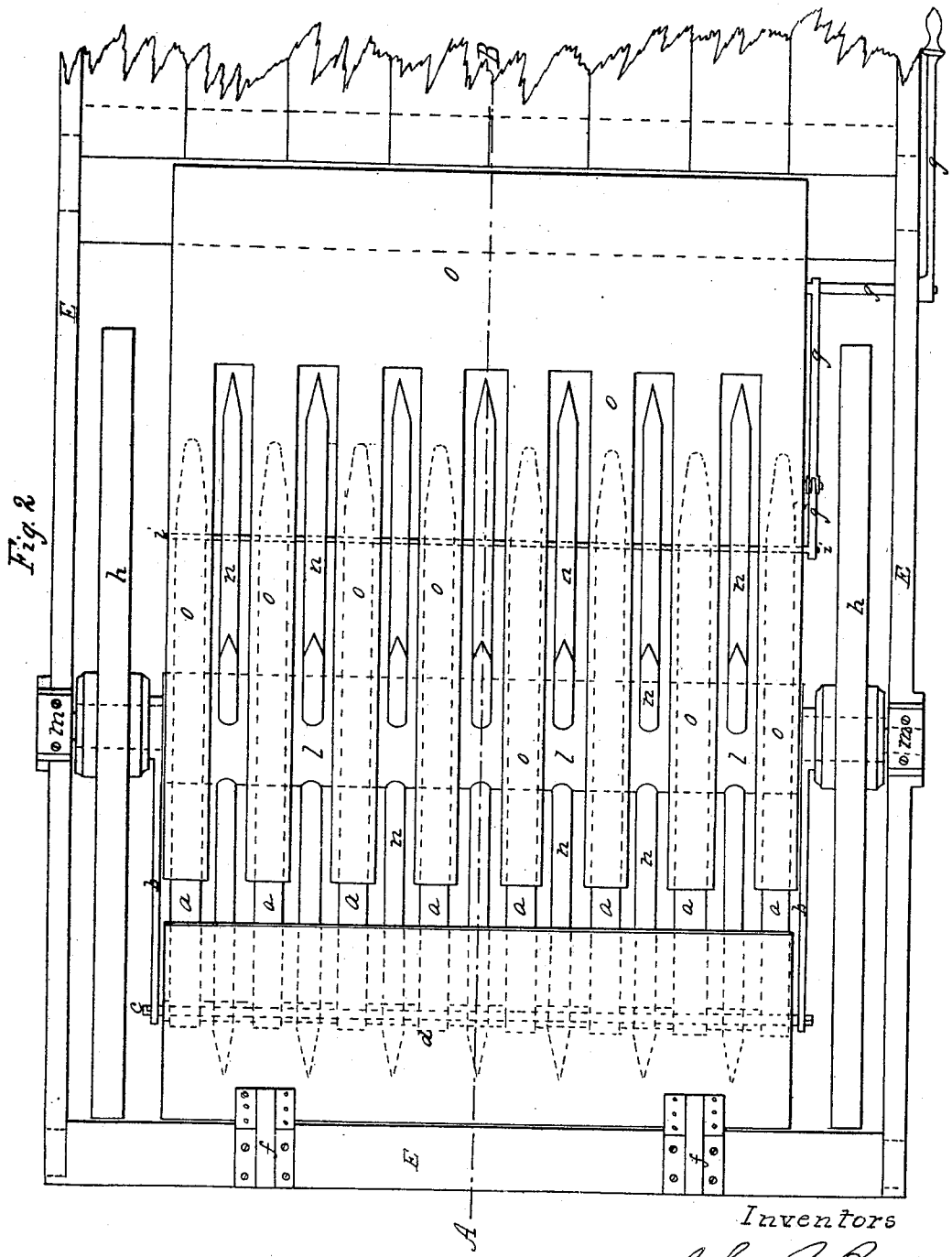

J. B. BENTON, J. F. BEHN & G. BASTIAN.
MACHINE FOR RAKING AND LOADING HAY.
No. 20,772. Patented July 6, 1858.
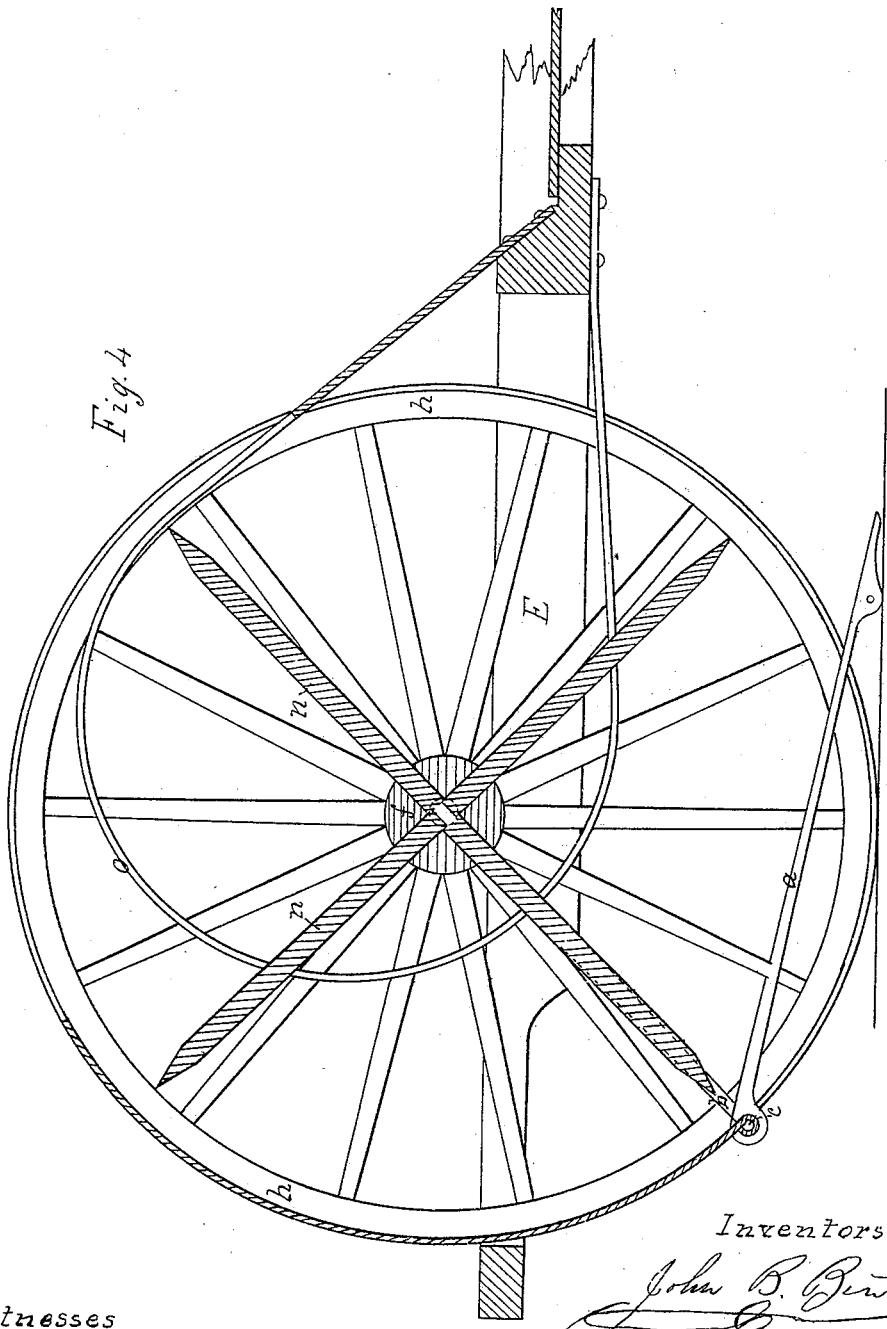

UNITED STATES PATENT OFFICE.

J. B. BENTON, J. F. BEHN, AND G. BASTIAN, OF BUFFALO, NEW YORK.

IMPROVEMENT IN MACHINES FOR RAKING AND LOADING HAY.

Specification forming part of Letters Patent No. 20,772, dated July 6, 1858.

*To all whom it may concern:*

Be it known that we, JOHN B. BENTON, JOHN F. BEHN, and GOTTLOB BASTIAN, of Buffalo, in the county of Erie, in the State of New York, have invented a new and Improved Machine for Gathering and Loading Grain; and we do hereby declare that the following is a full, clear, and exact description of the construction and operation of the same, reference being had to the accompanying drawings, making a part of this specification, in which—

Figure 1 represents a side view; Fig. 2, a top view; Fig. 3, an end view, and Fig. 4 a a transverse section through A B.

Letters of like name and kind refer to like parts in each of the figures.

The nature of our invention consists in gathering hay and grain and loading the same on a wagon, the machine being attached to the hind part, or being itself a part of the wagon.

To enable others skilled in the art to make and use our invention, we will proceed to describe its construction and operation.

Our machine, when in motion, will gather the hay or grain by means of rake-teeth $a\ a\ a$, which are connected to the arms $b$ by means of the rod $c$, passing directly through the heads of the rake-teeth $a\ a\ a$. Said rake-teeth are further secured by one end of the circular plate $d$ being fastened to the rod $c$, which, being firmly secured to the frame E by means of the brackets $f$, or by any other means, acts as a brace to keep said rod $c$ to its place.

The feet of the rake-teeth $a\ a\ a$ have on the bottom a projection, as shown in the drawings, so that if they meet with any obstruction they pass over said obstruction. The rod $i$, passing through the feet of the rake-teeth $a\ a\ a$, and being firmly secured to said teeth, keeps them in their proper position. The end of this rod $i$ is connected with a lever, $g$, so as to raise or lower the teeth $a\ a\ a$ at pleasure.

The wheels $h$ are firmly secured to the shaft $l$, which shaft turns in bearing-blocks $m$, which are attached to the frame E. To the shaft $l$ are firmly secured the forks $n$.

The circular plate $d$, which is secured to the frame E, as stated before, has the same radius from the shaft $l$ as the wheels $h$, commencing at an angle of forty-five degrees below the center of the shaft $l$, where they are fastened to the rod $i$, and continued so as to cover a space of about one hundred and five degrees. This circular plate $d$ is placed directly behind and between the wheels $h$.

The revolving forks $n$ are of such length as to come very near, but not in contact with, the plate $d$.

On and under the frame E, directly in front and between the wheels $h$, in firmly secured one end of the bands $o$, which pass directly under the shaft $l$ and between the forks $n$; thence forming a circle whose center is above and in front of the shaft $l$, to a point where the forks leave the bands $o$ at or about an angle of forty-five degrees with the center of the shaft $l$; thence sloping gradually to the bottom of the wagon, where they are again firmly secured.

The wagon being in motion, the rake-teeth $a\ a\ a$, which are directly between the two wheels of the wagon, gather the hay or grain, which is caught by the revolving forks $n$, which are firmly secured to the shaft $l$ at such distances apart as to pass between the rake-teeth $a\ a\ a$, and elevating it over the bands $o$, and between the plate $d$ and said bands, which plate $d$ keeps the hay or grain from leaving the forks before it is elevated. The hay and grain being raised to a point in front and above the center of the shaft $l$ on the bands $o$, the forks $n$, passing between and below the bands $o$, leave the hay or grain, which falls into the wagon. A man with a fork can distribute the hay or grain over the wagon as fast as delivered.

We do not claim the rake; neither do we claim the securing of the shaft to the wagon-wheels, nor the forks being attached to the shaft, as broadly considered; but

What we claim as our invention, and desire to secure by Letters Patent, is—

The combination of the bands $o$, plate $d$, and forks $n$, the whole being constructed and arranged for operation conjointly, as and for the purposes set forth.

JOHN B. BENTON.
J. F. BEHN.
GOTTLOB BASTIAN.

Witnesses:
LOUIS C. DUEMPELMANN,
D. D. BIDWELL.